United States Patent
Saw et al.

(10) Patent No.: US 12,321,578 B2
(45) Date of Patent: Jun. 3, 2025

(54) ENHANCED TECHNIQUES FOR BUILDING USER INTERFACES

(71) Applicant: Palantir Technologies Inc., Denver, CO (US)

(72) Inventors: Tiong Tjin Saw, New York, NY (US); Geoffrey Cameron, New York, NY (US); Sixin Li, Jersey City, NJ (US); Ali Mavrakis, Brooklyn, NY (US); Xinyi Wang, New York, NY (US); Myles Scolnick, New York, NY (US); Sander Kromwijk, Long Island City, NY (US)

(73) Assignee: Palantir Technologies Inc., Denver, CO (US)

( * ) Notice: Subject to any disclaimer, the term of this patent is extended or adjusted under 35 U.S.C. 154(b) by 25 days.

(21) Appl. No.: 17/643,515

(22) Filed: Dec. 9, 2021

(65) Prior Publication Data

US 2022/0244837 A1    Aug. 4, 2022

Related U.S. Application Data

(63) Continuation of application No. 16/669,298, filed on Oct. 30, 2019, now Pat. No. 11,199,955.
(Continued)

(51) Int. Cl.
*G06F 3/04845* (2022.01)
*G06F 3/0482* (2013.01)
(Continued)

(52) U.S. Cl.
CPC ........ *G06F 3/04845* (2013.01); *G06F 3/0482* (2013.01); *G06F 8/34* (2013.01);
(Continued)

(58) Field of Classification Search
CPC .. G06F 3/04845; G06F 3/0484; G06F 3/0482; G06F 16/9035; G06F 16/90335;
(Continued)

(56) References Cited

U.S. PATENT DOCUMENTS

| 5,432,903 A | 7/1995 | Frid-Nielsen |
| 5,550,971 A | 8/1996 | Brunner et al. |

(Continued)

FOREIGN PATENT DOCUMENTS

EP    3 800 548    4/2021

OTHER PUBLICATIONS

Official Communication for European Patent Application No. 20199477.9 dated Mar. 3, 2022, 6 pages.
(Continued)

*Primary Examiner* — Hwei-Min Lu
(74) *Attorney, Agent, or Firm* — Knobbe, Martens, Olson & Bear, LLP

(57) ABSTRACT

Methods and systems for enhanced techniques for building user interfaces. An example method includes presenting a builder user interface to create a consumer user interface. The builder user interface receives information usable to filter data objects associated with a data object type. The information includes a variable associated with a property indicated by the data object type and the variable is associated with a first user interface element of the consumer user interface. An association between a second user interface element included in the consumer user interface and presentation of information generated based on data objects is received. Adjustment of the first user interface element causes filtering of the data objects via adjustment of the variable updating of the information. Access to the consumer user interface is enabled.

21 Claims, 10 Drawing Sheets

Related U.S. Application Data

(60) Provisional application No. 62/909,413, filed on Oct. 2, 2019.

(51) Int. Cl.
  *G06F 8/34* (2018.01)
  *G06F 9/451* (2018.01)
  *G06F 16/903* (2019.01)
  *G06F 16/9035* (2019.01)

(52) U.S. Cl.
  CPC ........ *G06F 9/451* (2018.02); *G06F 16/90335* (2019.01); *G06F 16/9035* (2019.01)

(58) Field of Classification Search
  CPC ...... G06F 16/903; G06F 16/252; G06F 16/25; G06F 9/451; G06F 8/38; G06F 8/34; G06F 8/20
  USPC ........................................................ 715/810
  See application file for complete search history.

(56) References Cited

U.S. PATENT DOCUMENTS

| | | |
|---|---|---|
| 5,642,511 A | 6/1997 | Chow et al. |
| 5,696,702 A | 12/1997 | Skinner et al. |
| 5,701,400 A | 12/1997 | Amado |
| 5,740,444 A | 4/1998 | Frid-Nielsen |
| 5,844,554 A | 12/1998 | Geller et al. |
| 6,078,320 A | 6/2000 | Dove et al. |
| 6,083,277 A * | 7/2000 | Fowlow .................... G06F 8/34 717/109 |
| 6,189,138 B1 | 2/2001 | Fowlow et al. |
| 6,253,195 B1 | 6/2001 | Hudis et al. |
| 6,300,948 B1 * | 10/2001 | Geller ....................... G06F 8/34 715/962 |
| 6,754,885 B1 | 6/2004 | Dardinski et al. |
| 6,829,615 B2 | 12/2004 | Schirmer et al. |
| 6,938,205 B1 | 8/2005 | Hanson et al. |
| 6,996,569 B1 | 2/2006 | Bedell et al. |
| 7,055,104 B1 | 5/2006 | Billmaier et al. |
| 7,370,040 B1 | 5/2008 | Kruy et al. |
| 7,437,686 B1 | 10/2008 | Bernstein et al. |
| 7,636,697 B1 | 12/2009 | Dobson et al. |
| 7,716,630 B2 | 5/2010 | Wholey et al. |
| 7,870,162 B2 | 1/2011 | Weinberg et al. |
| 8,145,671 B2 | 3/2012 | Rizzolo et al. |
| 8,271,520 B1 | 9/2012 | Aman et al. |
| 8,386,960 B1 | 2/2013 | Eismann et al. |
| 8,484,189 B2 | 7/2013 | Dewar et al. |
| 8,484,233 B2 | 7/2013 | Xie et al. |
| 8,788,545 B2 | 7/2014 | Braksator et al. |
| 8,798,023 B2 | 8/2014 | Chen et al. |
| 8,799,166 B1 * | 8/2014 | Burkholder ............ G06Q 30/06 705/51 |
| 8,924,872 B1 | 12/2014 | Bogomolov et al. |
| 9,116,975 B2 | 8/2015 | Shankar et al. |
| 9,348,888 B1 | 5/2016 | Labaj et al. |
| 9,378,526 B2 | 6/2016 | Sampson |
| 9,417,760 B2 | 8/2016 | Li et al. |
| 9,589,070 B2 | 3/2017 | Gitelman |
| 9,880,696 B2 | 1/2018 | Ward et al. |
| 10,001,909 B2 | 6/2018 | Edwards et al. |
| 10,133,953 B2 | 11/2018 | Vaindiner et al. |
| 10,324,609 B2 | 6/2019 | Sanches et al. |
| 10,620,937 B1 | 4/2020 | Bross et al. |
| 10,643,291 B2 | 5/2020 | Kanner et al. |
| 11,199,955 B2 | 12/2021 | Saw et al. |
| 2001/0052109 A1 | 12/2001 | Nagashima et al. |
| 2003/0195877 A1 * | 10/2003 | Ford ........................ G06F 16/35 |
| 2003/0211447 A1 | 11/2003 | Diesel et al. |
| 2005/0004911 A1 | 1/2005 | Goldberg |
| 2005/0015363 A1 | 1/2005 | Dessloch et al. |
| 2005/0091197 A1 | 4/2005 | Dettinger et al. |
| 2005/0108206 A1 | 5/2005 | Lam et al. |
| 2005/0234931 A1 | 10/2005 | Yip et al. |
| 2006/0090130 A1 | 4/2006 | Bent et al. |
| 2006/0095276 A1 * | 5/2006 | Axelrod ................. G06Q 99/00 717/104 |
| 2006/0095403 A1 | 5/2006 | Chen et al. |
| 2006/0156228 A1 | 7/2006 | Gallo et al. |
| 2006/0206860 A1 | 9/2006 | Dardinski et al. |
| 2006/0206866 A1 | 9/2006 | Eldrige et al. |
| 2007/0011668 A1 | 1/2007 | Wholey et al. |
| 2007/0074156 A1 | 3/2007 | Nelson et al. |
| 2007/0078886 A1 | 4/2007 | Rivette et al. |
| 2007/0150429 A1 | 6/2007 | Huelsman et al. |
| 2007/0277153 A1 | 11/2007 | Ambrose et al. |
| 2008/0028434 A1 | 1/2008 | Drazin |
| 2008/0092068 A1 | 4/2008 | Norring et al. |
| 2009/0070685 A1 * | 3/2009 | Pamu ................... G06F 16/2428 715/745 |
| 2009/0125130 A1 | 5/2009 | Eldridge et al. |
| 2009/0222749 A1 | 9/2009 | Marinescu et al. |
| 2009/0327883 A1 * | 12/2009 | Robertson ............... G06F 16/44 707/999.102 |
| 2010/0114931 A1 | 5/2010 | Xie et al. |
| 2010/0222902 A1 | 9/2010 | Eldridge et al. |
| 2010/0223593 A1 | 9/2010 | Eldridge et al. |
| 2010/0332350 A1 * | 12/2010 | Rinehart ............. G06Q 30/0643 705/27.2 |
| 2011/0271250 A1 | 1/2011 | Park et al. |
| 2011/0107194 A1 * | 5/2011 | Cui ........................ G06F 16/382 715/810 |
| 2011/0112887 A1 | 5/2011 | Rizzolo et al. |
| 2011/0119605 A1 * | 5/2011 | Jayadevan ................ G06F 8/34 715/763 |
| 2012/0137238 A1 | 5/2012 | Abeln |
| 2012/0137268 A1 * | 5/2012 | Dattke ..................... G06F 8/38 717/105 |
| 2012/0163180 A1 | 6/2012 | Goel |
| 2012/0203825 A1 | 8/2012 | Choudhary et al. |
| 2012/0204122 A1 | 8/2012 | Brugler et al. |
| 2012/0210296 A1 * | 8/2012 | Boulter ............. G06Q 10/0631 717/107 |
| 2012/0254230 A1 | 10/2012 | Aman et al. |
| 2012/0302250 A1 | 11/2012 | Chen et al. |
| 2013/0013588 A1 | 1/2013 | Dewar et al. |
| 2013/0091153 A1 | 4/2013 | Gitelman |
| 2013/0275892 A1 | 10/2013 | Li et al. |
| 2013/0275919 A1 | 10/2013 | Kamath et al. |
| 2013/0332004 A1 | 12/2013 | Gompert et al. |
| 2014/0096037 A1 * | 4/2014 | Grosz ..................... G06F 3/1242 715/753 |
| 2014/0282252 A1 | 9/2014 | Edwards et al. |
| 2014/0297516 A1 * | 10/2014 | Brown .................... G06Q 20/00 715/753 |
| 2015/0082219 A1 * | 3/2015 | Beck .................. G06Q 10/0639 715/771 |
| 2015/0095365 A1 | 4/2015 | Olenick et al. |
| 2015/0112998 A1 | 4/2015 | Shankar et al. |
| 2015/0332108 A1 * | 11/2015 | Kalenkovich .......... G06Q 10/10 715/256 |
| 2015/0339373 A1 | 11/2015 | Carlson et al. |
| 2016/0092817 A1 | 3/2016 | Graham et al. |
| 2016/0364573 A1 | 12/2016 | Chan et al. |
| 2017/0004183 A1 * | 1/2017 | Srivastava ............ G06F 16/248 |
| 2017/0091879 A1 | 3/2017 | Kanner et al. |
| 2017/0115968 A1 * | 4/2017 | Fukala .................... G06F 16/25 |
| 2017/0123601 A1 | 5/2017 | Nguyen |
| 2017/0263120 A1 | 9/2017 | Durie, Jr. et al. |
| 2018/0004848 A1 * | 1/2018 | Zeng ................... G06F 16/3329 |
| 2018/0052898 A1 * | 2/2018 | Allan ................... G06F 16/2358 |
| 2018/0165724 A1 | 6/2018 | Rakshit |
| 2018/0223633 A1 | 8/2018 | Dinariev et al. |
| 2019/0065155 A1 * | 2/2019 | Varadarajan ............... G06F 8/34 |
| 2019/0065156 A1 * | 2/2019 | Varadarajan ............... G06F 8/70 |
| 2019/0187961 A1 | 6/2019 | Myung et al. |
| 2019/0188813 A1 * | 6/2019 | Maljanian ............... G06Q 50/22 |
| 2019/0235843 A1 * | 8/2019 | Wu ........................... G06F 8/35 |
| 2021/0096526 A1 * | 4/2021 | Ericsson ................ G05B 19/056 |

(56) References Cited

U.S. PATENT DOCUMENTS

2021/0103380 A1    4/2021   Saw et al.
2021/0141621 A1    5/2021   Scolnick et al.

OTHER PUBLICATIONS

Official Communication for European Patent Application No. 20199477.9 dated Nov. 6, 2023, 5 pages.
Official Communication for European Patent Application No. 20199477.9 dated Mar. 1, 2021, 8 pages.

* cited by examiner

| Canvas 510 | Filter objects 512 | | | | | | |
|---|---|---|---|---|---|---|---|
| Y Graph | Object set name [change color] | Table of 2k Asteroids 516 | | | | | X |
| OBJECT SETS (6) | Asteroids | TITLE | PERIOD | SEMIMAJORAXIS | NUMOFOBS | DESIGNATION | ROTATIONPERI |
| Asteroids | Starting with All Asteroids | Ceres | 4.60406087922 | 2.76750591440 | 6461 | 1 | 9.07417 |
| Asteroids | (+AND) Add a filter to limit your resulting object set | Pallas | 4.61429817638 | 2.77160610848 | 7829 | 2 | 7.8132 |
| Asteroids | 514 | Juno | 4.38461479534 | 2.67070024655 | 6611 | 3 | 7.21 |
| Search for filter... | ...where period is | Vesta | 3.62970234069 | 2.36179322702 | 7107 | 4 | 5.342 |
| Asteroids | ...where semimajoraxis is | Astraea | 4.12928426530 | 2.57380901103 | 2185 | 5 | 16.8 |
| Filter by linked objects | ...where numofobs is | Hebe | 3.77720184908 | 2.42535134482 | 5455 | 6 | 7.2745 |
| Asteroids | ...where designation is | Iris | 3.68717706011 | 2.38663985043 | 4780 | 7 | 7.139 |
| Asteroids | ...where rotationperiod is | Flora | 3.28754657131 | 2.20198812634 | 2311 | 8 | 12.865 |
| Ad | ...where meanmotion is | Metis | 3.68665538040 | 2.38643472764 | 2362 | 9 | 5.079 |
| | ...where earthmoid is | Hygiea | 5.56270145961 | 3.13943647919 | 2840 | 10 | 27.623 |
| | ...where diameter is | Parthenope | 3.84080205646 | 2.45250074975 | 4914 | 11 | 13.7204 |
| | ...where pha is | Victoria | 3.56463412284 | 2.33349226895 | 2365 | 12 | 8.6599 |
| | | Egeria | 4.13705302411 | 2.57704453185 | 1904 | 13 | 7.045 |
| | | Irene | 4.16028405950 | 2.58668287783 | 2255 | 14 | 15.028 |
| | | Eunomia | 4.29911611349 | 2.64391476302 | 2075 | 15 | 6.083 |
| | | Psyche | 4.99693324515 | 2.92278518236 | 2493 | 16 | 4.196 |
| | | Thetis | 3.88658833598 | 2.47195310257 | 2628 | 17 | 12.27048 |
| | | Charts for 2k Asteroids | | | | | |

ENHANCED TECHNIQUES FOR BUILDING USER INTERFACES

CROSS-REFERENCE TO RELATED APPLICATIONS

This application is a continuation of U.S. application Ser. No. 16/669,298, which was filed on Oct. 30, 2019 and which is entitled "ENHANCED TECHNIQUES FOR BUILDING USER INTERFACES," which claims priority to U.S. Prov. App No. 62/909,413, which was filed on Oct. 2, 2019 and which is entitled "ENHANCED TECHNIQUES FOR BUILDING USER INTERFACES," the disclosures of which are hereby incorporated herein by reference in their entirety.

Any and all applications for which a foreign or domestic priority claim is identified in the Application Data Sheet as filed with the present application are hereby incorporated by reference in their entirety under 37 CFR 1.57.

INCORPORATION BY REFERENCE STATEMENT

This application hereby incorporates by reference in its entirety U.S. Pat. No. 10,324,609, which was filed on Aug. 29, 2016 and which is entitled "SYSTEM FOR PROVIDING DYNAMIC LINKED PANELS IN USER INTERFACE."

TECHNICAL FIELD

The present disclosure relates to systems and techniques for data integration, analysis, and visualization. More specifically, the present disclosure relates to techniques for building user interfaces.

BACKGROUND

To reduce the technical burden related to creating user interfaces, user interface editors may be leveraged to quickly create detailed user interfaces. An example user interface editor may include a What You See Is What You Get (WYSIWYG) editor. For this example editor, a builder user may drag-and-drop user interface elements from a first portion of a builder user interface to a second portion. This second portion may represent an appearance of a consumer user interface which one or more consumers (e.g., end-users) may view. In this way, the builder user may use the example editor to place user interface elements, include interactive features, include text and/or images, and so on.

It may be appreciated that different user interface editors may be used to create user interfaces for different technological environments. For example, a user interface editor may be directed to building web pages. As another example, a user interface editor may be directed to building user interfaces for applications. In this example, an application may include a mobile application specific to a certain mobile operating system. These different user interface editors may thus mask at least some of the technical complexities associated with creating user interfaces. As an example, the look and feel of a web page may be created by a builder user without specific knowledge of markup, scripting, and/or style sheet languages.

While these user interface editors may be effective at creating rich user interfaces, they may provide a limited set of interactivity. For example, a builder user may prefer creating a user interface which dynamically presents information to a consumer user. In this example, the dynamically presented information may include information generated according to each consumer who visits the user interface. Thus, the builder user may prefer accessing information specific to each consumer and then presenting a portion of the accessed information. This added interactivity may require substantive programming, limiting a reach of the user interface editors to addressing just the visual aspects of a user interface.

SUMMARY

In addition to reducing technical complexity associated with creating user interfaces, a user interface editor may additionally help standardize a workflow associated with creating such user interfaces. For example, an entity may standardize use of a particular user interface editor. In this example, any user of the entity (referred to herein as a 'builder user') may rapidly create end-user user interfaces (referred to herein as 'consumer user interfaces') via the same user interface editor. This standardized use may help ensure that resulting consumer user interfaces follow similar design guidelines and/or have a similar look and feel. However, the entity may prefer that certain of the consumer user interfaces include portions which present dynamically determined information. As an example, a consumer user interface may be created which presents analyses of certain information stored by a back-end system (e.g., a database system). The information may be dynamically presented, such that a consumer user may adjust one or more sliders, filters, and so on, to adjust the information from which the analyses were determined. The consumer user may also adjust the specific analyses which are performed on the information stored by the back-end system.

Effectuating the above-described dynamic presentation presents tremendous technical complexity to builder users. For example, information may be stored by a back-system according to different formats or schemas. Additionally, specific information may be spread around database tables, included in different rows and columns, and so on. Thus, the builder user may need to understand these back-end complexities to identify the information to be used for analyses. Similarly, the builder user may additionally need to understand substantive scripting or query languages to enable the performance of the analyses. Even with this understanding, the builder user may then be required to associate the analyses with user interface elements. For example, the builder user may prefer to present the analyses in graphical form (e.g., a chart or graph).

Thus, using a standardized workflow to (1) create a consumer user interface and (2) enable presentation of dynamic information in the consumer user interface, may be difficult to institute. An entity may therefore have difficulty providing a standardized framework to create consumer user interfaces.

An example user interface editor described in U.S. Pat. No. 10,324,609, describes an innovative user interface tool to create user interfaces with dynamic information. The example user interface editor provides a standardized set of dynamic panels usable to present analyses of dynamically determined information. For this example user interface editor, a dynamic panel may be selected by a builder user. The builder user can then associate the selected panel with one or more data sources (e.g., relational databases, Elasticsearch based, and so on). Advantageously, the example user interface edits may provide a simple workflow for the creation of queries to access these data sources. The dynamic panel may thus easily present information obtained from the data sources.

Thus, and as an example, the above-described user interface editor may be used to create a consumer user interface which presents information associated with the National Football League (NFL). In this example, an example query may be executed to obtain data regarding NFL teams from multiple data sources. A first panel in the created consumer user interface may be a dropdown control usable to select a team. A second panel may be a dropdown control usable to select a particular season. A third panel may be a table that displays the games for the selected team and season. Any updates to the first panel or second panel may thus cause an updated query to be executed. The third panel may then present the results associated with the executed query.

The above-described user interface editor may cause execution of queries which use tabular data. For example, the tabular data may be stored in database tables of different data sources. With respect to certain types of information, it may be technically advantageous for a builder user to create queries which use data objects. As will be described below, a user interface editor described herein may enable use of data objects in consumer user interfaces. Additionally, the user interface editor described herein may provide enhanced builder user interfaces to rapidly associate data objects with portions of a consumer user interface being created.

As will be described below, a data object may represent an abstraction of a particular thing. For example, a data object may represent a data container for information representing specific things in the world that have a number of definable properties (also referred to herein as parameters). An example data object may represent a planet or a particular planet (e.g., Mars). In this example, the data object for a planet may include properties for its name, size information, orbit information, and so on. Thus, a builder user may create a consumer user interface which presents analyses performed on a multitude of these planet data objects. For example, the consumer user interface may enable the dynamic selection of particular planets by a consumer user. In response to selection, the consumer user interface may present analyses of the selected planets. As an example, average orbit information for the selected planets may be dynamically determined, and presented, to the consumer user.

Data objects may be used to represent certain information in a more natural way as compared with other forms of data representation (e.g., tabular data). Additionally, this more natural representation may provide technical enhancements with respect to performing analyses using data objects. With respect to the above-described example of planets, a builder user may quickly select certain planet data objects. The builder user may then quickly define one or more filters, logical operations, and so on, which use parameters of the planet data objects. A builder user may also create links with objects which are associated with a particular object type. A build user can then query through the object type to obtain the related linked objects. For example, an additional object type "spacecraft probe" may be linked to one or more planet objects. By searching the links to the "spacecraft probe" object "Voyager 1", a builder user may obtain the related linked planet objects without constructing additional queries. In contrast, and with respect to tabular data, the builder user may be required to have substantive knowledge of how the information is stored. For example, the builder user may be required to create a query which joins specific information across from multiple database tables. In this way, the incorporation of data objects may greatly enhance the capabilities, and usability, of the user interface editor described herein.

Thus, this specification describes example technical advantages and addresses technical problems. Prior user interface editors, such as the existing WYSIWYG editors, were unable to create consumer user interfaces which cause dynamic execution of queries to obtain data objects. As will be described, an example user interface editor may enable a builder user to visually create complex queries which use data objects. The builder user may additionally associate these complex queries with user interface elements of a consumer user interface. For example, in some embodiments the builder user may select from among a multitude of standardized user interface elements (e.g., graphs, charts, and so on) in which to present one or more analyses.

Additionally, the builder user may associate certain interactive elements with a query. For example, an interactive slider may be selected by the builder user interface. In this example, a query may be dynamically updated in response to a consumer user adjusting the interactive slider. As an example, the slider may update a range of values for a particular parameter of a data object. With respect to the example of planets, the slider may be associated with a size of a planet. As a consumer user adjusts the slider, queries may be executed to filter planets which are below a size selected based on the slider's position. Thus, any analyses presented to the consumer user may be dynamically updated.

In this way, an entity may use a standardized workflow to create complex, and interactive, consumer user interfaces. Through the use of data objects, builder users may leverage the efficiencies associated with storing information as discrete data objects. For example, the builder users may avoid having to learn specific database schemas for back-end data sources. Instead, the data objects may be associated with specific parameters such that the builder user can easily reference information of interest. The data objects may also have relationships already set up and the builder user can leverage this information when building their interface. In this way, the succinct builder user interfaces described herein mask the complexities of creating complex database queries.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing user interface editors are limited in various ways, and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIGS. 5A-5D illustrate example builder user interfaces.

DETAILED DESCRIPTION

Introduction

Figure 1A:
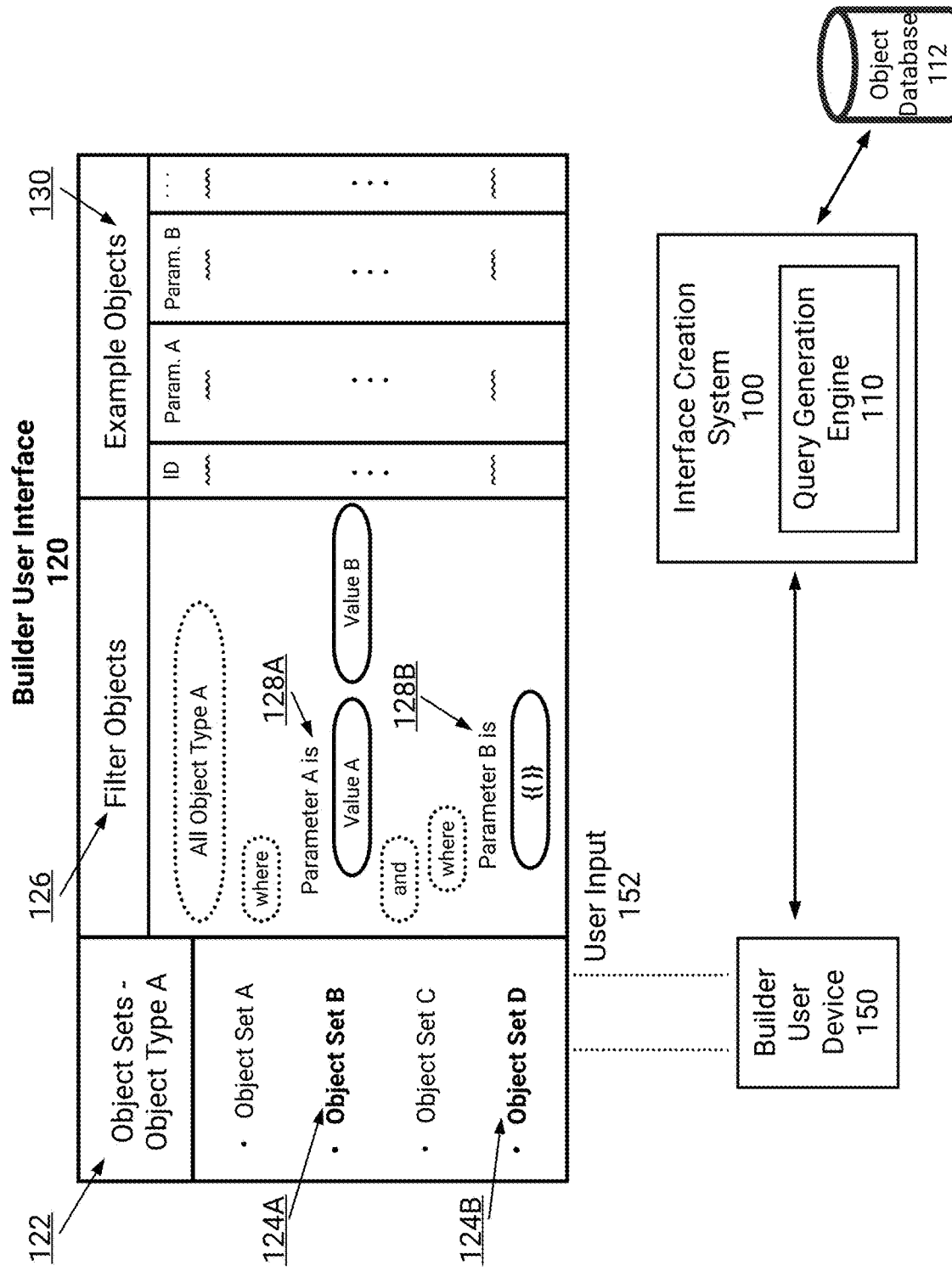
FIG. 1A illustrates an example builder user interface for dynamically filtering data objects.

This specification describes techniques to create consumer user interfaces which dynamically present analyses performed on data objects. An example user interface editor described herein may allow a builder user to create consumer user interfaces for use by consumer users (e.g., end-users). The user interface editor may, in some embodiments, be an example of a What You See Is What You Get (WYSIWYG) editor. Via the user interface editor, a builder user may create a visual look of a consumer user interface. For example, the builder user may drag and drop certain user interface elements onto the consumer user interface being created. Example user interface elements may include boxes, lines, textual portions, images, certain logos or identifiers, animations, and so on. Additionally, the builder user may prefer that certain user interface elements be configured to present dynamically determined information.

Example builder user interfaces described herein may, via succinct user input, enable complex queries to be created. These complex queries may cause analyses to be performed using data objects stored by a system described herein (e.g., the interface creation system 100). As will be described, the consumer user interface may be configured to cause execution of queries based, at least in part, on user input provided by a consumer user. In this way, the consumer user interface may be dynamically updated with information generated using the stored data objects. Advantageously, the user input may cause adjustment to the queries, such that the consumer user interface is configured to dynamically update the analyses in real-time (e.g., substantially real-time).

Example User Interface Editor

An example of a user interface editor is described in U.S. Pat. No. 10,324,609, which is incorporated herein by reference in its entirety. This example user interface editor provides dynamic panels in a builder user interface. These dynamic panels may be configured for inclusion in a consumer user interface, and used to present dynamically determined information. As described in, at least, FIG. 1 of U.S. Pat. No. 10,324,609, the dynamic panels may be associated with queries which use tabular data stored by one or more data sources. The queries may be executed and an output (e.g., one or more analyses) may be presented via the dynamic panels.

As an example, the above-described dynamic panels can display different pieces of data from one or more data sources. For example, a query can be run on one or more data sources, and different parts of the result from the query can be output using different dynamic panels. For instance, each dynamic panel can be associated with a variable to output. Different types of dynamic panels can be provided, such as charts (e.g., line chart, bar chart, etc.), controls (e.g., dropdown, multiselect box, search box, etc.), maps, tables, text boxes, etc. The panels can be data source agnostic. For example, the panels can be associated with data from different types of data sources, such as relational databases (e.g., SQL Server), Elasticsearch based, and so on.

Optionally, multiple panels can be used to display different aspects of the result from a query. One query can be run to obtain the needed information, and the result can be parsed and displayed using multiple panels. Display of information can be simplified by using multiple panels. Also, the query can be reused across panels since each panel can extract a portion of the result to display. In certain embodiments, each panel may have its own query and display the result of the query. The panels can also be linked together so that the data from one panel can be used to display the data in another panel.

Described, at least, in FIGS. 2A-2D of U.S. Pat. No. 10,324,609 are example user interfaces associated with creating dynamic panels. These example user interfaces may be used by a builder user to manage the above-described panels. For example, in FIG. 2D the builder user may design a visual appearance associated with the panels and/or consumer user interface being created. Optionally, the builder user may select from among a plurality of templates or existing visual appearances of the panels. The builder user may then use a user interface to create one or more queries to be associated with the panels. Optionally, the builder user may select from among an existing set of queries. The panels may thus present information generated based on execution of the queries.

Advantageously, the queries may include certain variables which may be tied to interactive user interface elements of a consumer user interface. As an example, a variable may be used for a certain parameter. With respect to an example of planetary data, a variable may be used to represent a lower bound on certain size information of planets. This variable may then be tied to, for example, a slider user interface element in the consumer user interface. Thus, if a consumer user adjusts the slider user interface element, the consumer user may adjust a lower bound of the size information. For example, a value for the variable in a query may be adjusted accordingly. In this way, the consumer user interface may present an updated analysis based on execution of the adjusted query. Thus, the consumer user interface may present dynamically determined information to the consumer user.

As described above, the information obtained using queries may, as an example, be stored in database tables. For example, the information may be stored as tabular data. The builder user may therefore create queries which join disparate information from across the database tables.

Data Object User Interface Editor

As will be described, the builder user interfaces described herein enable creation of consumer user interfaces which present dynamically determined analyses of data objects. For example, a builder user interface editor may allow for information associated with data objects to be included in a consumer user interface. As described below, with respect to FIGS. 1A-1B, a builder user may select a data object type of interest. As an example, the builder user may select a data object type corresponding to NFL teams. The builder user may additionally select certain sets of data objects associated with the data object type. With respect to NFL teams, the different sets of data objects may correspond to different geographical regions or NFL conferences. The builder user may then optionally specify certain values of parameters associated with the data object type to generate one or more filters. As an example, the builder user may specify values corresponding to certain team names. One or more queries may be created based on these filters. Similar to the above-example user interface editor, the queries may then be associated with user interface elements in a consumer user interface. Thus and as an example, an analysis may present NFL statistical information for certain teams in the consumer user interface.

Advantageously, the builder user may use curly brackets (e.g., '{{ }}') to indicate that values of a property (also referred to herein as a parameter) will be dynamically determined based on user input provided by a consumer, via variables or other similar templating mechanism linking one or more user interface elements with the properties. For example, a builder user may use curly brackets to specify that the value for a certain parameter will be supplied by a consumer user. In this example, the value for the certain parameter may be linked to the output of one or more other user interface elements (e.g., sliders, dropdowns, radio buttons, etc.) via one or more variables or other similar templating mechanism. Thus, a consumer user may provide user input to modify such user interface elements that are linked to the parameter, and the value for the certain parameter may thus be supplied based on the user input. In this way, a variable or other similar templating mechanism may be used for the value of a parameter with the value being dynamically provided according to a slider or other user interface element. While reference to curly brackets or a variable is included herein, in some embodiments any handlebar templating mechanism may be used.

Overview

FIG. 1A illustrates an example builder user interface 120 for dynamically filtering data objects. The builder user interface 120 may form, in some embodiments, part of a workflow associated with creating a consumer user interface. For example, the builder user interface 120 may be used to create one or more queries which are to be associated with portions of the consumer user interface.

The builder user interface 120 may be an example of a user interface presented as a web page via a builder user device 150. Optionally, the builder user interface 120 may be a web application which is associated with a back-end system (e.g., the interface creation system 100). The builder user interface 120 may additionally be an example of a user interface for an application. An example application may include a mobile application, a desktop application, and so on. The builder user device 150 may be used by a builder user, and may include a laptop, tablet, mobile device, wearable device, and so on. As will be described, the builder user may use the builder user interface 120 to cause creation of one or more queries. These queries may then be associated with user interface elements of a consumer user interface.

In the illustrated example, the builder user has provided user input 152 to specify an object type. For example, the builder user has selected 'Object Type A'. It may be appreciated that user input 152 may encompass disparate input types. For example, the builder user may use a keyboard/mouse, provide touch-input to a touch sensitive display of the builder user device 150, provide verbal commands which are processed, at least in part, by the builder user device 150, and so on. To select the object type, the builder user interface 120 may include functionality to search for existing object types. As an example, the builder user interface 120 may include a search box. In this example, the builder user may provide at least a portion of text indicative of an object type. The interface creation system 100 may then search an ontology to identify responsive object types.

Optionally, the builder user interface 120 may present indications of certain object types in the builder user interface 120. For example, the builder user interface 120 may identify a top threshold number of object types based on one or more measures. These measures may indicate, for example, popularity of object types across builder users. As another example, the interface creation system 100 may determine contextual information associated with a consumer user interface being created. In this example, the builder user may have created a portion of the consumer user interface. For example, the builder user may have included text which is indicative of a purpose of the consumer user interface. Example text may include, "Analysis of [Object Type A]." For this example text, the system 100 may therefore infer that Object Type A is to be used. In this way, the builder user interface 120 may present object types for selection which are determined to be contextually relevant for the builder user.

Each object type may optionally be associated with different object sets. For example, different object sets may each comprise multiple data objects. These object sets may be used to classify, or otherwise separate, certain data objects from each other. With respect to an example of planets, there may be multitudes of different object sets. Each of these object sets may include planet data objects which have been classified together. For example, a first object set may include planet data objects corresponding to planets which are within a threshold distance of Earth. In this example, a second object set may include planet data objects corresponding to planets within a next threshold distance of Earth.

In the example of FIG. 1A, the builder user interface 120 indicates that there are, at least, four object sets. For example, Object Set A-Object Set D is included in the user interface 120. Similar to the above, the interface creation system 100 may select certain object sets of a selected object type which are contextually relevant. For example, the builder user may be creating a consumer user interface which describes 'Planets Within Our Solar System." As another example, the builder user may be creating a consumer user interface which presents "Usage Information for Cloud Network in [City A]." The interface creation system 100 may thus analyze text, or other information (e.g., images), included in the consumer user interface. As an example, the interface creation system 100 may use example deep learning techniques (e.g., recurrent neural networks, convolutional neural networks). With respect to the above examples, the interface creation system 100 may thus present object sets corresponding to planets within our solar system or object sets associated with City A.

In the illustrated example, the builder user has selected Object Set B 124A and Object Set D 124B from among the presented object sets. Optionally, the builder user interface 120 may respond to user input provided to a particular presented object set. For example, the builder user may use touch-based input to select Object Set B 124A. In this example, the builder user may 'long-press' Object Set B 124A for greater than a threshold amount of time. In response, the builder user interface 120 may present indications of data objects included in Object Set B 124A. For example, a popup, or separate user interface window, may be presented which includes indications of data objects. In this example, names associated with the data objects optionally along with example properties may be presented.

As will be described in more detail below, with respect to FIGS. 2-3, object types may be associated with parameters. For example, an ontology may provide a data model for the data objects. This ontology may be used by the interface creation system 100 to access the parameters for Object Type A 122. As will be described, the parameters may be specified by the builder user to filter data objects. For example, the builder user may prefer that an analysis included in the consumer user interface includes only data objects with certain parameters. An example consumer user interface may include an analysis of a network in a certain city. The builder user may prefer that the analysis use only certain systems associated with the network. Thus, the builder user may filter the data objects, such that only the certain systems are included in the analysis.

The builder user interface 120 includes a filter portion 126. This portion 126 may be used to specify logical expressions associated with parameters of a selected object type. The builder user interface 120 may present a name, or other identifying information, associated with a parameter of the selected object type. Optionally, the builder user interface 120 may present indications of all parameters of the selected object type. The builder user may then select a parameter of interest, for example via specifying at least a portion of the name. The interface creation system 100 may additionally present an initial parameter which is contextually relevant to a consumer user interface being created. With respect to the example of a cloud network, the builder user interface 120 may present system latency as the initially presented parameter.

In the illustrated example, the builder user has selected Parameter A 128A. The builder user has additionally included example values for Parameter A 128A. For example, Value A and Value B are specified. This may represent a range of values for Parameter A 128A. Thus, data objects with a value for Parameter A 128A outside of this range may be filtered out.

The builder user can chain values of parameters according to logical expressions. As an example, the builder user can indicate that only data objects with a certain range of values for Parameter A 128A and a certain range of values for one or more other parameters are to be used in an analysis included in a consumer user interface. Thus, the builder user may specify a logical expression using Boolean operations for set operations (e.g. AND, OR, NOT, and so on). In the example of FIG. 1A, the builder user has indicated that Parameter A 128A is to be logically combined with Parameter B 128B using an AND Boolean operation.

In contrast to Parameter A 128A, for which a range of values was specified, the builder user has used a variable or template for Parameter B 128B. As described in U.S. Pat. No. 10,324,609, which is incorporated herein by reference in its entirety, the builder user may associate a parameter with a user interface element in the consumer user interface. The variable or template may indicate that values for Parameter B 128B are to be supplied in accordance with the user interface element. Example user interface elements may include a slider, date picker, dropdown control, button (e.g., export button, query button, etc.), input box, multiselect box, text area, timeline, and so on. For example, values for Parameter B 128B may be supplied based on a position of a slider. Thus, a consumer user may adjust the slider when viewing the consumer user interface and the value may be adjusted accordingly.

For example, the builder user has used curly brackets for the value of Parameter B (e.g., '{{ }}'). While the illustrated example uses curly brackets, it may be appreciated that such a value is arbitrary. Indeed, other values may be used and fall within the scope of the disclosure. Additionally, the builder user interface 120 may include a user interface element associated with designating a variable for a parameter. For example, there may be a radio box or checkmark proximate to Parameter B. In this example, the builder user may select the radio box or checkmark to designate that values for Parameter B will be tied to a user interface element in a resulting consumer user interface.

In this way, the builder user may specify one or more logical expressions which are usable to filter data objects. In some embodiments, the builder user may use two or more object types. For example, the builder user may indicate that Object Type A and Object Type B are to be used. The builder user may then specify parameters as described above. In this way, data objects corresponding to both Object Type A and Object Type B may be used. An analysis may then be included in a consumer user interface which leverages both object types.

The builder user interface 120 may present example data objects 130 which satisfy the information specified in the filter portion 126. For example, the interface creation system 100 may access one or more databases (e.g., object database 112) to identify responsive data objects. In some embodiments, a query generation engine 110 may create a query in accordance with the information included in filter portion 126. As information is included in filter portion 126, the query generation engine 110 may execute a query in accordance with the information. In real-time (e.g., substantially real-time), the builder user interface 120 may be updated to reflect data objects obtained based on execution of the query. In this way, the builder user may view data objects which are to be used in one or more analyses.

The example data objects 130 may be presented along with values of example parameters for Object Type A. As illustrated, builder user interface 120 includes an identification of each data object along with values for Parameter A and Parameter B. In some embodiments, the builder user interface may include a user interface element which is to be included in a consumer user interface. The user interface element may be selected by the builder user to adjust a value of Parameter B 128B. For example, the user interface element may be a slider. The builder user interface 120 may therefore include an example slider for adjustment by the builder user. In response to adjustment, a value for Parameter B 128B may be selected.

In some embodiments, the builder user interface 120 may present an example analysis which is to be included in a consumer user interface. As an example, the builder user may specify certain operations to be performed on information associated with data objects. The operations may aggregate information associated with the data objects. Thus, the builder user interface 120 may present an example analysis based on the data objects which satisfy the information included in the filter portion 126. The example analysis may be associated with one or more user interface elements which are to be included in the consumer user interface. For example, the example analysis may be presented as a graph. Advantageously, the builder user interface 120 may present a graph as would be included in the consumer user interface. In this way, the builder user may quickly identify whether the analysis is accurate.

Figure 1B:
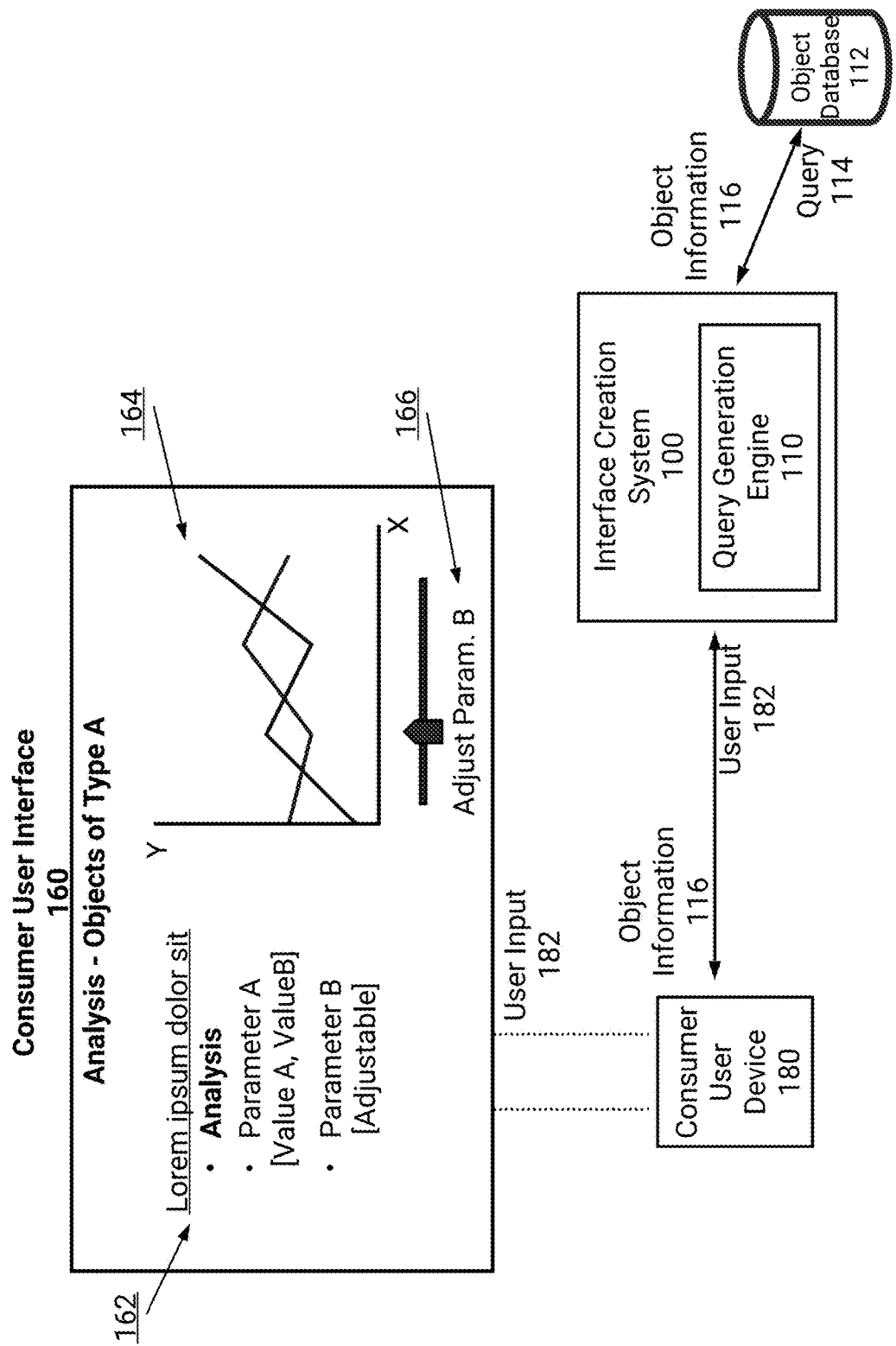
FIG. 1B illustrates an example consumer user interface presenting an example analysis of dynamically determined data objects.

FIG. 1B illustrates an example consumer user interface 160 presenting an example analysis of dynamically determined data objects. As described in FIG. 1A, the builder user may specify information usable to filter data objects. For example, the builder user may specify an object type. As another example, the builder user may specify one or more logical expressions to filter data objects of the specified object type. In response, the interface creation system 100 may create one or more queries to filter the data objects in accordance with the specified information. As will be described, these queries may be executed by the interface creation system 100 to present information to a consumer user in a consumer user interface.

In the illustrated example, the consumer user interface 160 is being presented via a consumer user device 180. For example, the consumer user device 160 may be a laptop, tablet, mobile device, wearable device, and so on as described above. The consumer user interface 160 may have been created by a builder user, such as the builder user described in FIG. 1A. Advantageously, the builder user may use a user interface editor (e.g., a WYSIWYG editor) to include the example visual elements of consumer user interface 160. As described above, a certain user interface element 164 may be usable to present an analysis of information dynamically determined based on data objects. Additionally, a certain user interface element 166 may be usable to provide a value for a particular parameter in one or more queries being executed by the interface creation system 100.

The consumer user interface 160 includes an example description 162 of the analysis. For example, the user interface 160 indicates that an analysis is being performed for a certain object type (e.g., Object Type A). The user interface 160 further indicates a range of values which are being used for data objects included in the analysis. For example, Parameter A is indicated being within a range from Value A to Value B. As another example, the user interface 160 indicates that a value for Parameter B can be selected via adjustment of user interface element 166.

An example analysis is represented in chart 164. While the example of FIG. 1B illustrates a chart 164, it may be appreciated that other representations may be used. A builder user may optionally select from among a multitude of existing representations. For example, the builder user may select from a table, a chart, a bar graph, a pie chart, three-dimensional representations, and so on.

The included analysis may be dynamically determined in real-time (e.g., substantially real-time). For example, a consumer user may provide user input 182 to the consumer user interface 160. Example user input 182 may include adjustment of slider 166. As described in FIG. 1A, the slider 166 may indicate a value for Parameter B. As an example, a movement of the slider 166 from a left to a right position may indicate an increase in a value for Parameter B. This user input 182 may thus be routed to the interface creation system 100 to provide a value for the variable associated with Parameter B. The system 100 may then execute a query 114 which includes the provided value for Parameter B. The executed query 114 may cause access to one or more databases (e.g., the object database 112) to obtain responsive data objects. For example, object information 116 may be obtained by the interface creation system 100.

In some embodiments, the interface creation system 100 may route the object information 116 to the consumer user device 180. For example, the data objects may be routed to the user device 180. Optionally, the object information 116 may be provided in a particular form (e.g., JavaScript Object Notation). In some embodiments, the consumer user device 180 may use the object information 116 to update the chart 164. As an example, the user device 180 may effectuate one or more analyses via code included in, or otherwise associated with, user interface information associated with user interface 160.

In some embodiments, the interface creation system 100 may perform the one or more analyses and update chart 164. With respect to a web application, the interface creation system 100 may thus generate a new graphical representation of the analyses. This new graphical representation may then be included in a web page presented via consumer user device 180.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for data object types and property types for data in a database, and how data objects and properties (also referred to herein as parameters) may be related.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, Elasticsearch based etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties (herein also referred to as a parameter). For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The data object's attributes (e.g. metadata about the data object) may be represented in one or more properties or parameters.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Builder User: A user who creates, and/or designs, a consumer user interface for use by consumer users. The user may use a user interface editor, such as example builder user interfaces.

Builder User Interface: A user interface with which a builder user can create a consumer user interface. Example builder user interfaces are represented in FIGS. 1A and 5A-5D. Additional builder user interfaces are included in U.S. Pat. No. 10,324,609, which is hereby incorporated herein by reference in its entirety.

Consumer User: An end-user who uses a consumer user interface created, and/or designed, by one or more builder users. The end-user may interact with the consumer user interface via a user device, such as a laptop, tablet, mobile device, wearable device, and so on.

Consumer User Interface: A user interface with which a consumer user interacts. The consumer user interface may, as an example, present one or more analyses of data objects. For example, information associated with the data objects may be aggregated.

Object-Centric Data Model

To provide a framework for the following discussion of specific systems and methods described herein, an example database system 210 using an ontology 205 will now be described. In some embodiments, the interface creation system 100 may implement, or otherwise be associated with, the example database system 210. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

Figure 2:
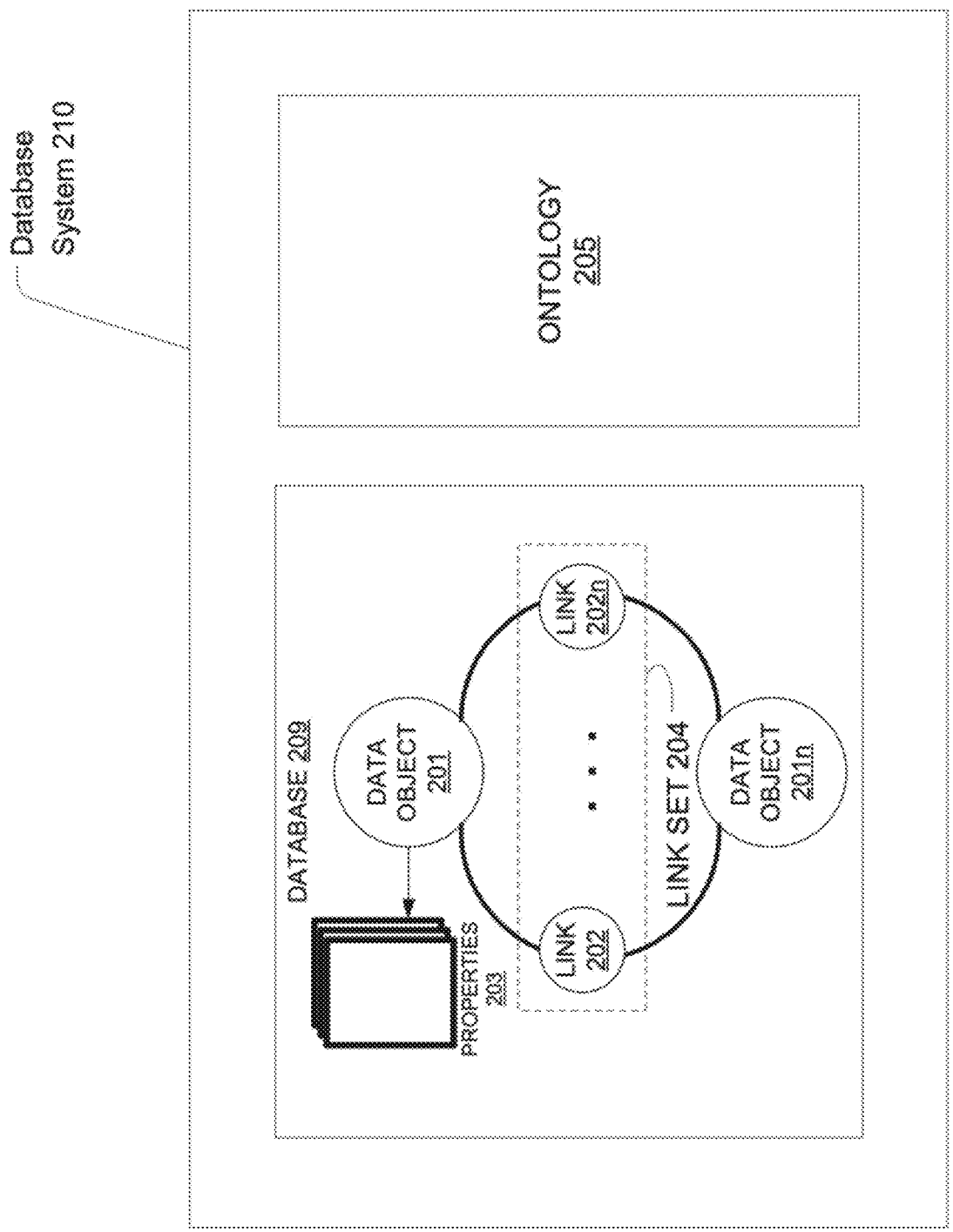
FIG. 2 illustrates one embodiment of a database system using an ontology.

FIG. 2 illustrates an object-centric conceptual data model according to an embodiment. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 210 may have a property type defined by the ontology 205 used by the database 209.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on Mar. 27, 2009 (e.g., a property of type "date") may be stored in the database 209 as an event object with associated currency and date properties as defined within the ontology 205. The data objects defined in the ontology 205 may support property multiplicity. In particular, a data object 201 may be allowed to have more than one property 203 of the same property type. For example, a "Person" data object might have multiple "Address" properties or multiple "Name" properties.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Figure 3:
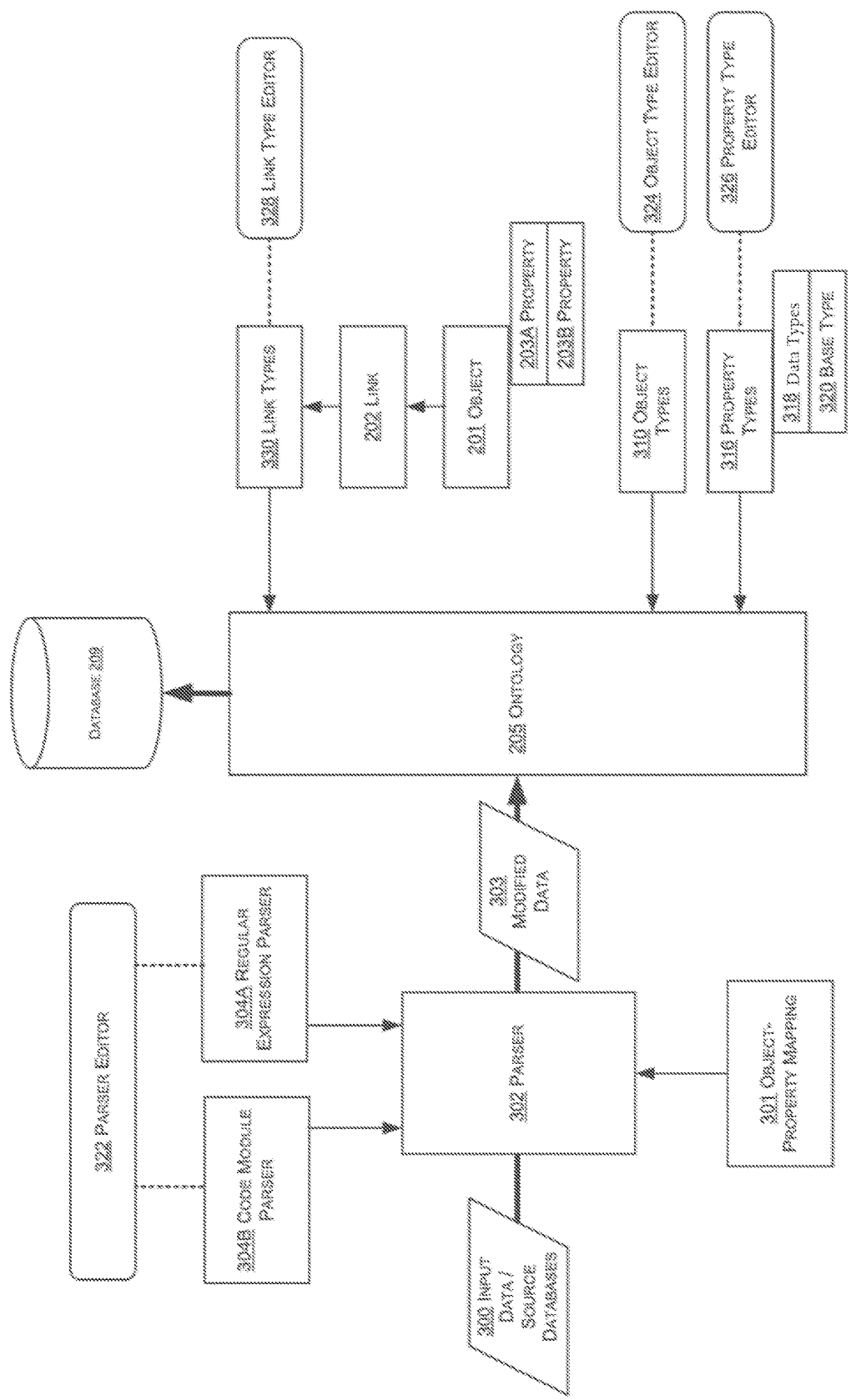
FIG. 3 illustrates one embodiment of a system for creating data in a data store using a dynamic ontology.

FIG. 3 is a block diagram illustrating exemplary components and data that may be used in identifying and storing data according to an ontology. In this example, the ontology may be configured, and data in the data model populated, by a system of parsers and ontology configuration tools. In the embodiment of FIG. 3, input data 300 is provided to parser 302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 302 is able to read a variety of source input data types and determine which type of data it is reading.

In accordance with the discussion above, the example ontology 205 comprises stored information providing the data model of data stored in database 209, and the ontology is defined by one or more object types 310, one or more property types 316, and one or more link types 330. Based on information determined by the parser 302 or other mapping of source input information to object type, one or more data objects 201 may be instantiated in the database 209 based on respective determined object types 310, and each of the objects 201 has one or more properties 203 that are instantiated based on property types 316. Two data objects 201 may be connected by one or more links 202 that may be instantiated based on link types 330. The property types 316 each may comprise one or more data types 318, such as a string, number, etc. Property types 316 may be instantiated based on a base property type 320. For example, a base property type 320 may be "Locations" and a property type 316 may be "Home."

In an embodiment, a user of the system uses an object type editor 324 to create and/or modify the object types 310 and define attributes of the object types. In an embodiment, a user of the system uses a property type editor 326 to create and/or modify the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 326 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. Once defined, both a regular expression parser 304A and a code module parser 304B can provide input to parser 302 to control parsing of input data 300.

Using the data types defined in the ontology, input data 300 may be parsed by the parser 302 determine which object type 310 should receive data from a record created from the input data, and which property types 316 should be assigned to data from individual field values in the input data. Based on the object-property mapping 301, the parser 302 selects one of the parser definitions that is associated with a property type in the input data. The parser parses an input data field using the selected parser definition, resulting in creating new or modified data 303. The new or modified data 303 is added to the database 209 according to ontology 205 by storing values of the new or modified data in a property of the specified property type. As a result, input data 300 having varying format or syntax can be created in database 209. The ontology 205 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into new or modified input data 303.

Example Flowchart and Builder User Interfaces

Figure 4:
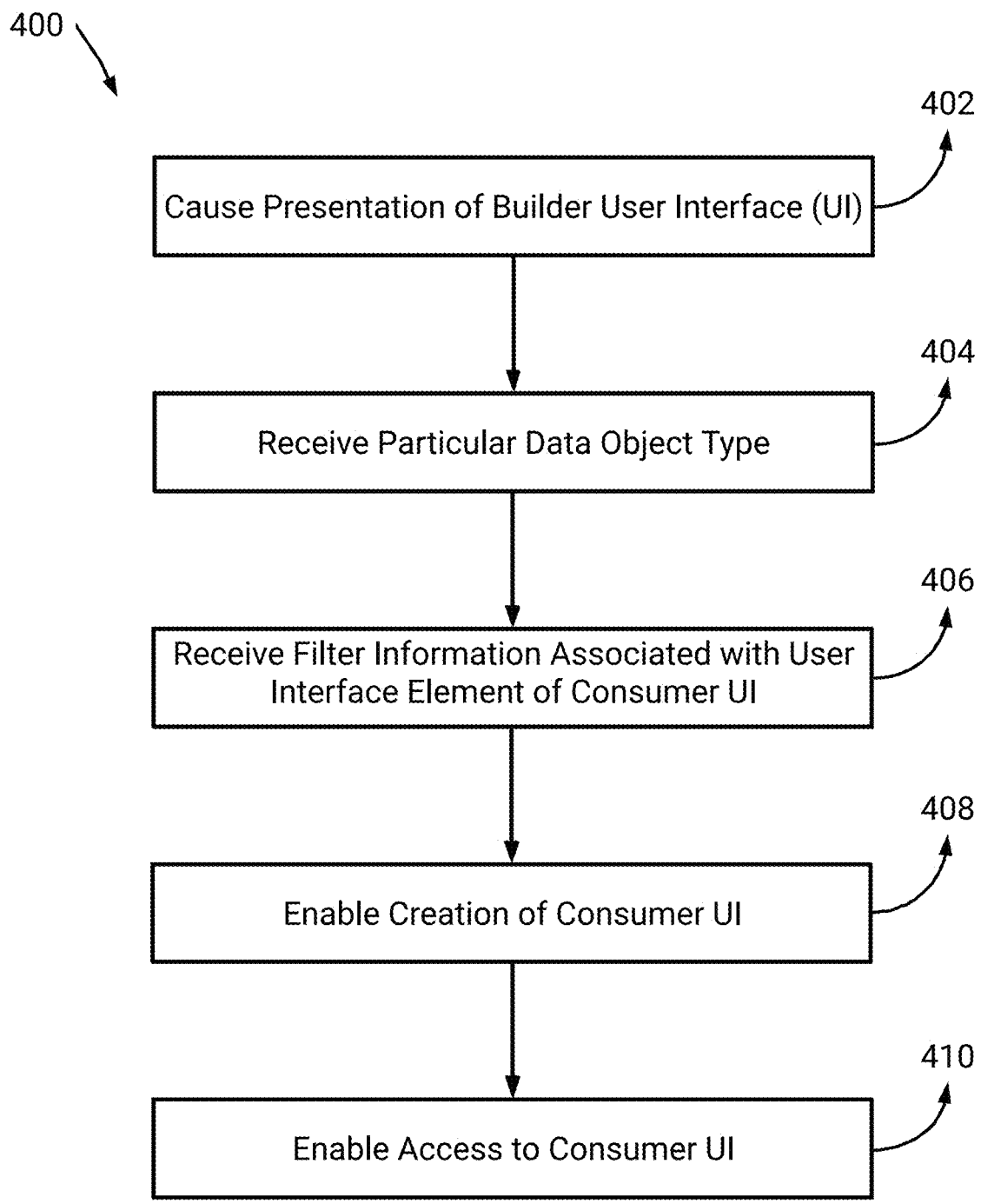
FIG. 4 is a flowchart of an example process for enabling creation of a consumer user interface.

FIG. 4 is a flowchart of an example process 400 for enabling creation of a consumer user interface. For convenience, the process 400 will be described as being performed by a system of one or more computers (e.g., the interface creation system 100). For the process 400, a builder user may use a user device of one or more processors in communication with the system.

At block 402, the system causes presentation of a builder user interface. As described above, with respect to FIGS. 1A-1B, a builder user may use an example user interface editor to create a consumer user interface. For example, the builder user may create the consumer user interface 160 illustrated in FIG. 1B. As described herein, the builder user may prefer presenting dynamic information to a consumer user in the consumer user interface. For example, the builder user may prefer that one or more analyses, or aggregations, of information be presented. Advantageously, and according to the described techniques, the builder user may cause the performance of analyses using data objects.

Thus, the builder user may interact with the builder user interface to specify data objects which are to be used in one or more analyses. As described in FIG. 1A, the builder user may specify information usable to filter data objects.

At block 404, the system receives a particular object type associated with a data object. As described above, each data object may be associated with one or more object types. An example object type may be a planet. For this example object type, data objects may include respective planets. Parameters of the object type may include information associated with planets. Thus, each data object may include information associated with a respective planet. The builder user may interact with the presented builder user interface to select a particular object type.

In some embodiments, the builder user may select two or more object types. For example, the builder user may specify that an analysis is to be performed using information from two or more object types. In this example, a first object type may represent planets while a second object type may represent stars. Thus, an analysis may be performed which includes planetary and star information.

At block 406, the system receives filter information associated with a user interface element. As described above, the builder user may prefer that only certain data objects are implicated in one or more analyses. Thus, the builder user may specify values, ranges of values, or variables, for one or more parameters associated with the object type. For example, the builder user may indicate a particular range of values for a first parameter. As another example, the builder user may indicate a particular range where at least one end of the range is a variable. In this example, the builder user may use a certain variable or template designation (e.g., '{{ }}'). As described above, this variable may represent that a value is to be supplied dynamically based on user input from a consumer user.

The builder user may additionally associate this filter information with a user interface element. For example, a variable may be associated with a slider. In this example, the slider may extend from a first value to a second value. A consumer user may adjust the slider to cause selection of a particular value within this range. Optionally, the first value and second value may be automatically identified by the system according to a highest and lowest value for the associated parameter across data objects (e.g., all of the data objects, a subset of the data objects).

As another example of a user interface element, a dropdown control may be associated with the filter information (e.g., a variable). In this example, a consumer user may interact with the dropdown control to select a value, range of values, and so on. In some embodiments, the builder user may specify certain values which may be selected in the dropdown control. In some embodiments, the builder user may specify cerate ranges of values, or may allow for a consumer user to specify a desired value for a parameter. As another example of a user interface element, an input box may be used by a consumer user to specify a value or range of values. Additional examples of interactive elements may be used and fall within the scope of the present disclosure (e.g., hardware buttons on a mobile device such as the volume buttons may increase a value, a stepper, toggles, and so on).

In some embodiments, variables or templates may be combined. For example, a first variable may be associated with a first parameter as described herein. Optionally, a builder user may cause this second parameter to reference the first variable. For example, a linear or non-linear formula may be used for the second parameter which uses the first variable. Thus, if a consumer user adjusts a first user interface element tied to the first variable, then a value for the second parameter may be updated accordingly. Similarly, the second parameter may reference a second variable or template. This second variable may be tied to a second user interface element. Thus, the value for the second parameter may be tied to interactions with the first user interface element and second user interface element.

In some embodiments, the builder user may interact with a builder user interface to select the user interface element. Additionally, the builder user may interact with a builder user interface to drag and drop the user interface element onto a consumer user interface being created. In this way, the builder user may quickly ascertain an overall look of the consumer user interface. Additionally, the builder user may then quickly associate the specific user interface element with a variable usable to filter data objects.

At block 408, the system enables creation of a consumer user interface. As described above, the builder user may use a user interface editor to drag and drop user interface elements onto a consumer user interface. Additional techniques to create a consumer user interface may be used and fall within the scope of the disclosure herein. For example, existing templates of consumer user interfaces may be accessed. The builder user may then select a template and adjust the template using a WYSIWYG editor.

The builder user may additionally select a user interface element to be associated with presentation of information generated based on data objects. For example, the user interface element may be a graphical depiction of the information. In this example, the user interface element may be a chart, graph, and so on as described herein. As another example, the user interface element may be generated as audio output via a user device. In this example, the audio may be generated to describe aspects of the data objects.

The builder user may optionally specify techniques for generating an analysis with data objects. For example, the builder user may specify a particular formula which uses information associated with data objects. As an example, the particular formula may reference certain parameters associated with the object type. In some embodiments, the builder user may select from among existing analyses. As an example, existing analyses may include measures of central tendency of certain parameters.

At block 410, the system enables access to the consumer user interface. The system may therefore generate user interface information corresponding to the consumer user interface. For example, the system may generate information which may be rendered via a web browser. As another example, the system may generate information which may be executed by a mobile device to cause presentation of the consumer user interface.

A consumer user may therefore view the consumer user interface. As described in FIG. 1B, the consumer user may interact with one or more user interface elements. For example, the consumer user may interact with a slider to specify a value for a particular parameter. In response, the system may execute a query to filter data objects based on the specified value. The system may then update any analyses which are included in the consumer user interface.

Figure 5A:
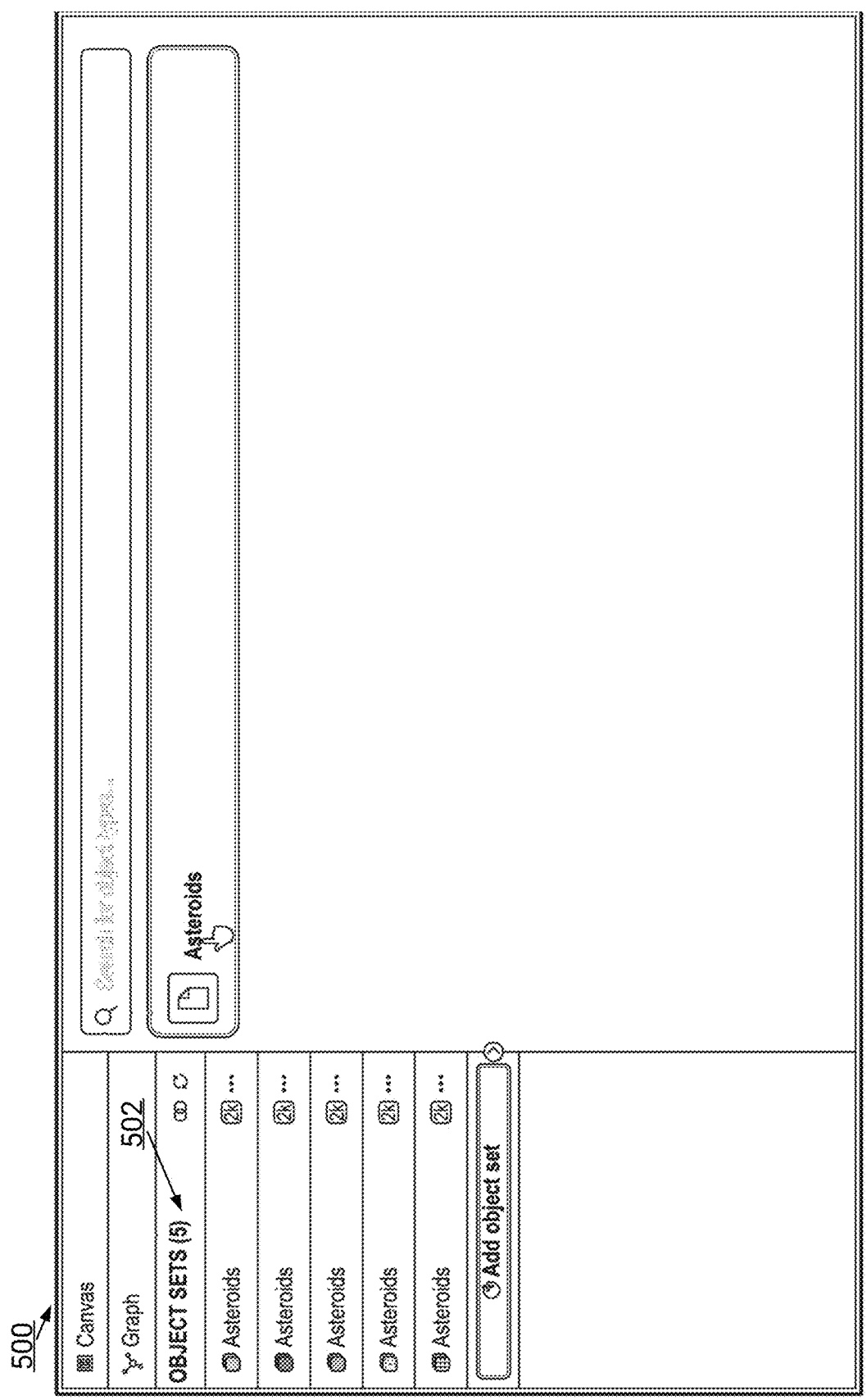

FIG. 5A illustrates an example builder user interface 500. In the example of FIG. 5A, a builder user is selecting an object type. Specifically, the builder user has selected an object type 'Asteroid.' The builder user interface 500 includes indications of object sets 502 corresponding to this object type. Each object set is identified with a number of included data objects (e.g., '2 k'). The builder user may optionally select certain of these object sets, or all of the object sets may be selected.

FIG. 5B illustrates another example builder user interface 510. In the example of FIG. 5B, a builder user is specifying filter information 512. For example, the builder user has selected 'Asteroid' object type and is selecting a parameter to filter the data objects. Advantageously, user interface 510 indicates example parameters 514. For example, the builder user can indicate values of, "period," "semimajoraxis," "rotationperiod," and so on. As described in FIG. 1A, the builder user can define a logical expression which uses combinations of these parameters. The builder user interface 510 additionally includes examples data objects on a right portion 516.

Figure 5C:
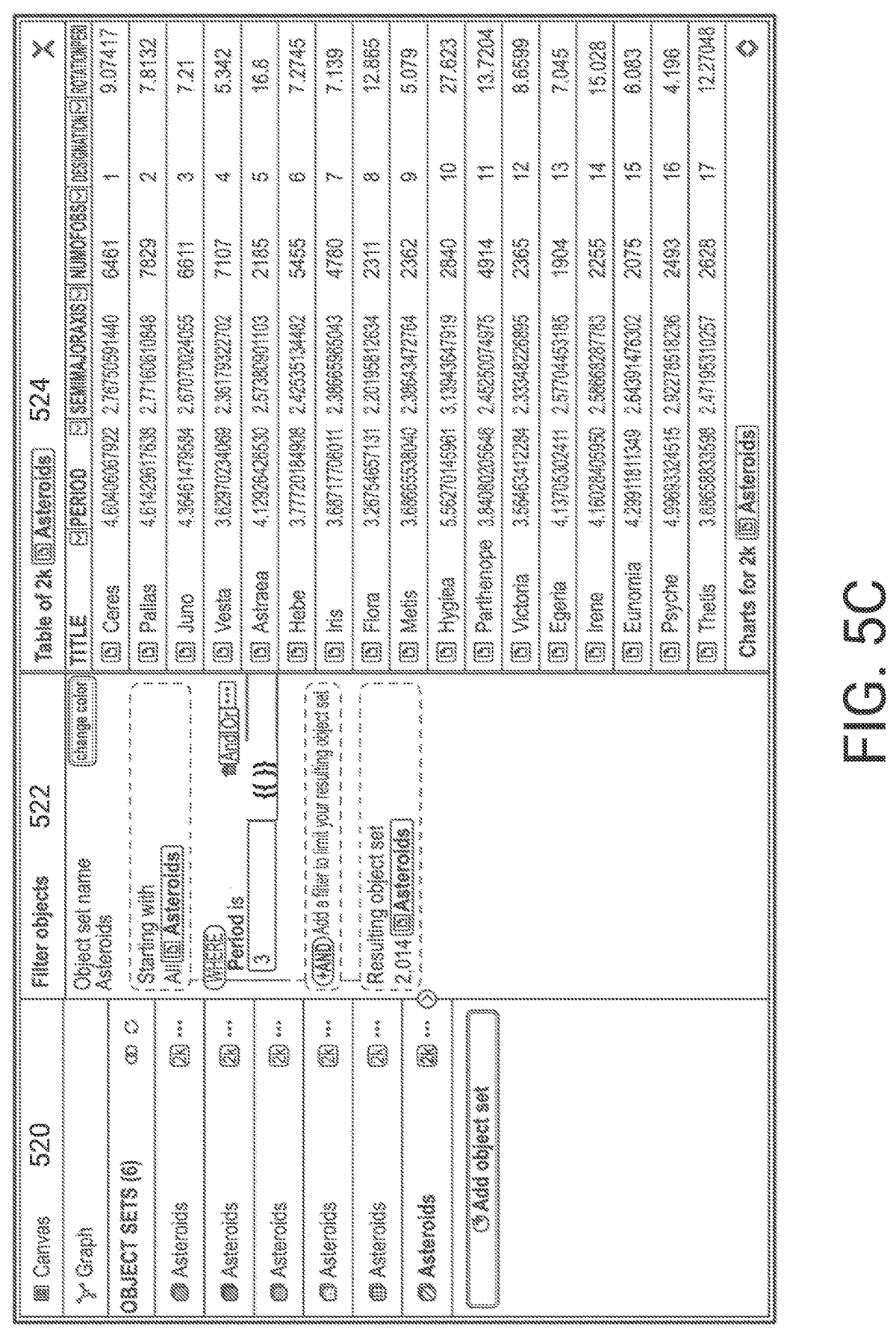

FIG. 5C illustrates another example builder user interface 520. In FIG. 5C, the builder user has specified values for the parameter of 'Period" in the filter information portion 522. Specifically, the builder user has indicated a lower bound of "3." The builder user has indicated that the upper bound is to be variable by using curly brackets. As described above, the system (e.g., interface creation system 100) may recognize the curly brackets as corresponding to a variable. The builder user may then associate this upper bound with a particular user interface element (e.g., slider).

In some embodiments, the builder user interface 520 may update to present example user interface elements. The builder user may then select a particular user interface element as being associated with the upper bound of the parameter. In some embodiments, the system may store information indicating that a particular variable is the upper bound of the parameter. As the builder user, or another builder user, creates the consumer user interface, the system may prompt the builder user to associate a user interface element with the variable.

FIG. 5C further includes example data objects 524 which satisfy the information specified in the filter information portion 522. The system may execute a query which is generated based on the specified information. For example, the system may identify data objects which have a lower bound of '3' for parameter 'Period.'

Figure 5D:
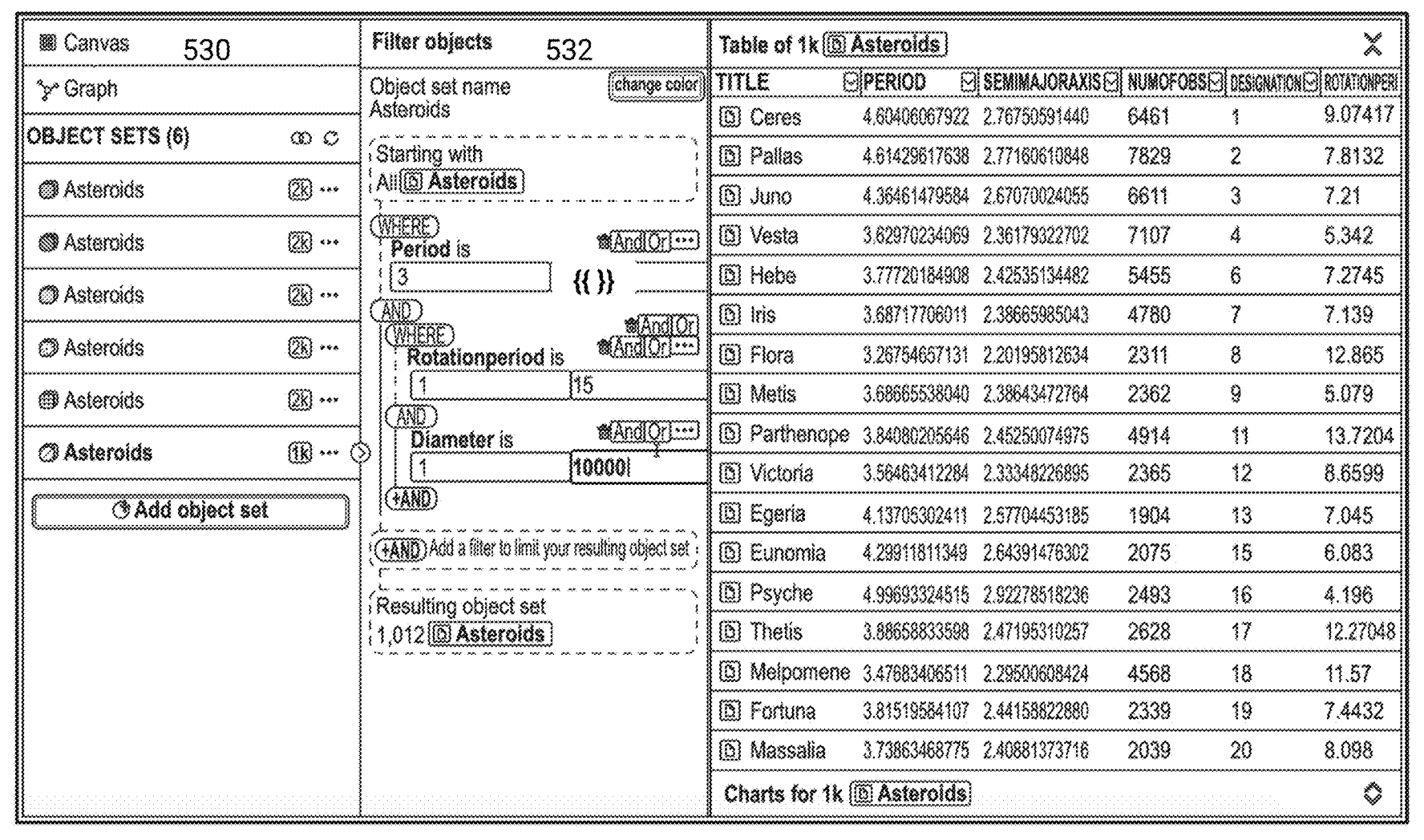

FIG. 5D illustrates another example builder user interface 530. In this example, the builder user has created a complex logical operation in the filter information portion 532. For example, the builder user has specified values for parameter 'Period', 'Rotationperiod', and 'Diameter'.

ADDITIONAL IMPLEMENTATION DETAILS
AND EMBODIMENTS

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
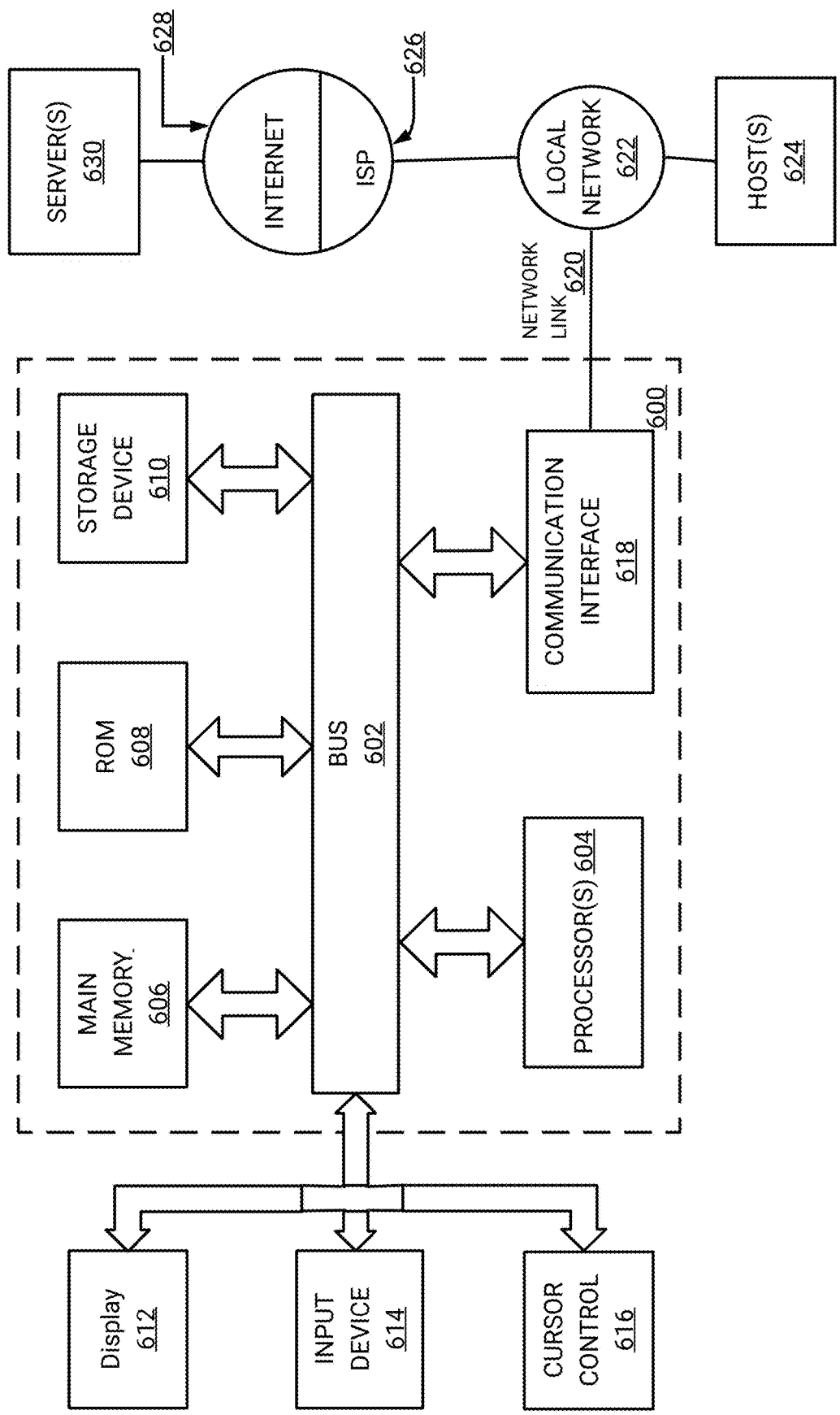
FIG. 6 is a block diagram that illustrates a computer system upon which various embodiments may be implemented.

For example, FIG. 6 is a block diagram that illustrates a computer system 600 upon which various embodiments may be implemented. Computer system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

Computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 600 may include a user interface module to implement a GUI that may be stored in a mass storage device as computer executable program instructions that are executed by the computing device(s). Computer system 600 may further, as described below, implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more computer readable program instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

Various forms of computer readable storage media may be involved in carrying one or more sequences of one or more computer readable program instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method comprising:
by a system of one or more computers,
causing presentation, via a user device, of a builder user interface, the builder user interface being associated with building a consumer user interface, wherein the builder user interface is configured to:
determine, using a machine learning model, based on contextual information associated with a first portion of the consumer user interface being built, a plurality of object types, wherein each object type of the plurality of object types is associated with a plurality of objects, and wherein at least a second portion of the consumer user interface has been created;
present, in the builder user interface, an identified top threshold number of object types of the plurality of object types, wherein the top threshold number of object types are identified based on a selection measure;
receive a first user input identifying selection of a subset of the plurality of object types;
receive a second user input identifying selection of one or more properties of the subset of the plurality of object types to filter data objects associated with the subset of the plurality of object types; and
associate a user interface element which is to be included in the consumer user interface with a particular property of the one or more properties of the subset of object types, wherein adjustment of the user interface element causes filtering based on the adjustment; and
enabling access, by one or more consumers, to the consumer user interface.

2. The method of claim 1, wherein the first portion of the consumer user interface includes text, and wherein the contextual information is determined based on the text.

3. The method of claim 1, wherein the first portion of the consumer user interface includes an image, and wherein the contextual information is determined based on the image.

4. The method of claim 1, wherein each object type is associated with at least one object set, wherein each object set comprises a set of data objects, and wherein the data objects associated with the one or more properties of the subset of the object types are included in at least one of the object sets.

5. The method of claim 4, wherein the builder user interface is configured to present a subset of the object sets based on the contextual information.

6. The method of claim 1, wherein the builder user interface responds to a third user input provided to a particular data set and presents an indication of a subset of the data objects included in the particular data set.

7. The method of claim 1, wherein the particular property is presented via the builder user interface as being contextually relevant to the consumer user interface.

8. The method of claim 1, wherein a special character is included as a value for the particular property, and wherein the special character is indicative of an adjustable variable associated with the particular property which is tied to the user interface element.

9. The method of claim 1, wherein the selection measure is a popularity of each object type across a plurality of users.

10. A computing system comprising:
one or more computer processors; and
non-transitory computer-readable media storing instructions that, when executed by the one or more computer processors, cause the computing system to perform operations comprising:
causing presentation, via a user device, of a builder user interface, the builder user interface being associated with building a consumer user interface, wherein the builder user interface is configured to:
determine, using a machine learning model, based on contextual information associated with a first portion of the consumer user interface being built, a plurality of object types, wherein each object type of the plurality of object types is associated with a plurality of objects, and wherein at least a second portion of the consumer user interface has been created;
present, in the builder user interface, an identified top threshold number of object types of the plurality of object types, wherein the top threshold number of object types are identified based on a selection measure;
receive a first user input identifying selection of a subset of the plurality of object types;
receive a second user input identifying selection of one or more properties of the subset of the plurality of object types to filter data objects associated with the subset of the plurality of object types; and
associate a user interface element which is to be included in the consumer user interface with a particular property of the one or more properties of the subset of object types, wherein adjustment of the user interface element causes filtering based on the adjustment; and
enabling access, by one or more consumers, to the consumer user interface.

11. The computing system of claim 10, wherein the first portion of the consumer user interface includes text, and wherein the contextual information is determined based on the text.

12. The computing system of claim 10, wherein the first portion of the consumer user interface includes an image, and wherein the contextual information is determined based on the image.

13. The computing system of claim 10, wherein each object type is associated with at least one object set, wherein each object set comprises a set of data objects, and wherein the data objects associated with the one or more properties of the subset of the object types are included in at least one of the object sets.

14. The computing system of claim 13, wherein the builder user interface is configured to present a subset of the object sets based on the contextual information.

15. The computing system of claim 10, wherein the builder user interface responds to a third user input provided to a particular data set and presents an indication of a subset of the data objects included in the particular data set.

16. The computing system of claim 10, wherein the particular property is presented via the builder user interface as being contextually relevant to the consumer user interface.

17. The computing system of claim 10, wherein a special character is included as a value for the particular property, and wherein the special character is indicative of an adjustable variable associated with the particular property which is tied to the user interface element.

18. Non-transitory computer storage media storing instructions that when executed by a system of one or more processors, cause the one or more processors to perform operations comprising:
   causing presentation, via a user device, of a builder user interface, the builder user interface being associated with building a consumer user interface, wherein the builder user interface is configured to:
      determine, using a machine learning model, based on contextual information associated with a first portion of the consumer user interface being built, a plurality of object types, wherein each object type of the plurality of object types is associated with a plurality of objects, and wherein at least a second portion of the consumer user interface has been created;
      present, in the builder user interface, an identified top threshold number of object types of the plurality of object types, wherein the top threshold number of object types are identified based on a selection measure;
      receive a first user input identifying selection of a subset of the plurality of object types;
      receive a second user input identifying selection of one or more properties of the subset of the plurality of object types to filter data objects associated with the subset of the plurality of object types; and
      associate a user interface element which is to be included in the consumer user interface with a particular property of the one or more properties of the subset of object types, wherein adjustment of the user interface element causes filtering based on the adjustment; and
   enabling access, by one or more consumers, to the consumer user interface.

19. The computer storage media of claim 18, wherein the first portion of the consumer user interface includes text or an image, and wherein the contextual information is determined based on the text or the image.

20. The computer storage media of claim 18, wherein each object type is associated with at least one object set, wherein each object set comprises a set of data objects, wherein the data objects associated with the one or more properties of the subset of the object types are included in at least one of the object sets, and wherein the builder user interface is configured to present a subset of the object sets based on the contextual information.

21. The computer storage media of claim 18, wherein the builder user interface responds to a third user input provided to a particular data set and presents an indication of a subset of data objects included in the particular data set, and wherein the particular property is presented via the builder user interface as being contextually relevant to the consumer user interface.

* * * * *